United States Patent Office

2,807,636
Patented Sept. 24, 1957

2,807,636

POLYESTERS OF PHOSPHORYL-SUBSTITUTED ALCOHOLS AND POLYBASIC PHOSPHORUS ACIDS

Vernon W. Buls, Walnut Creek, and Rupert C. Morris, Berkeley, Calif., assignors to Shell Development Company, Emeryville, Calif., a corporation of Delaware No Drawing. Application April 13, 1953,
Serial No. 348,576

15 Claims. (Cl. 260—461)

This invention pertains to certain novel phosphorus esters and to a method for their preparation. More particularly, the present invention pertains to certain novel esters of phosphonic acids, which esters contain in their structure two other esterified phosphono, or two phosphinico, groups, these groups being linked to the phosphonic acid ester by the alkylene groups which compose the ester radicals of the phosphonic acid ester. These novel esters may be characterized as esters of phosphonyl-substituted alcohols such as 2-(dialkyl phosphono) ethanol, with polybasic phosphorus acids, especially phosphonic acids.

The new esters to which the invention pertains have the structure represented by the general formula:

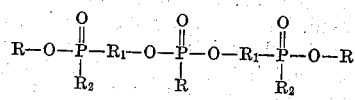

In said formula, the R's each represent a hydrocarbon group, each $R_1$ represents an alkylene group, and $R_2$ represents either R or R—O—. The invention thus provides the esters represented by the foregoing structural formulas wherein the groups represented by $R_1$, which may be the same or different, may be straight-chain or branched-chain alkylene groups containing from 2 to 10 carbon atoms, a preferable group being those containing from 2 to 8 carbon atoms. The groups represented by R, which may be the same or different, are essentially hydrocarbon groups which may be either aliphatic or aromatic in character. By the term "essentially hydrocarbon" it is meant that the radical represented by R is an unsubstituted hydrocarbon radical or, if a substituted hydrocarbon radical, it is one which is substituted only to a minor extent by inert substituents which do not alter the basically hydrocarbon character of the radical. In the preferred esters, the group R is an unsubstituted monovalent hydrocarbon radical. In a still more preferred class of esters the group R—O— represents the residue of an aliphatic alcohol, containing from 1 to 12 carbon atoms, and preferably from 1 to 8 carbon atoms.

The phosphono group is defined as the group having the structure

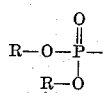

and the phosphinico group is defined as the group having the structure

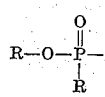

R having the meaning described above.

The novel esters of the invention are the product of the reaction between an ester derivative of a phosphinic acid in which the groups composing the ester radicals are halogen substituted, and certain ester derivatives of trivalent phosphorus. Thus, the method for preparing the claimed esters consists of the reaction of (a) a diester of a halohydrin and a polybasic phosphorus acid, and (b) a neutral ester of a phosphorous or phosphonous acid.

The reaction may be illustrated by the following equations, which describe the reaction of bis(2-bromoethyl) benzene phosphonate with tributyl phosphite and with dibutyl butane phosphonite to produce bis[2-(di-n-butyl phosphono)ethyl] benzene phosphonate and bis[2-(n-butyl n-butane phosphinico)ethyl] benzene phosphonate, respectively.

(a) $2(C_4H_9O)_3P + (BrC_2H_4O)_2(C_6H_5)P(O) \rightarrow$
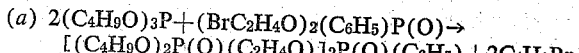
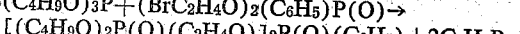
   $[(C_4H_9O)_2P(O)(C_2H_4O)]_2P(O)(C_6H_5) + 2C_4H_9Br$ (b) $2(C_4H_9O)_2P(C_4H_9) + (BrC_2H_4O)_2(C_6H_5)P(O) \rightarrow$
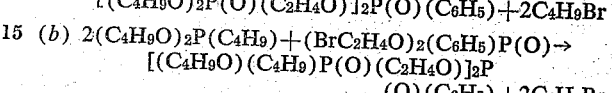
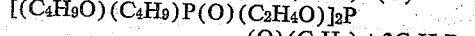
   $[(C_4H_9O)(C_4H_9)P(O)(C_2H_4O)]_2P$
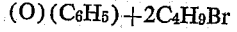
                          $(O)(C_6H_5) + 2C_4H_9Br$ The alkali metal diesters of phosphorous acids can also be employed equivalently to produce the novel esters represented by the general formula above.

In the more general case, the reaction between the triester, or alkali metal salt of a diester of phosphorous acid, or a diester of a phosphonous acid, and a phosphonate can be represented by the following equations:

(c)
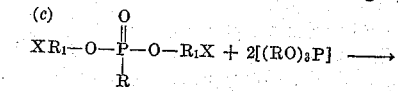

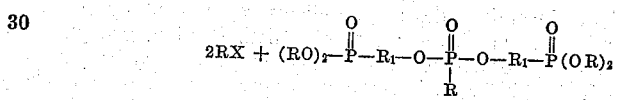

(d)
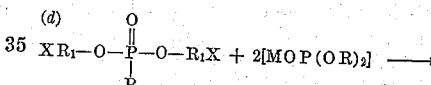

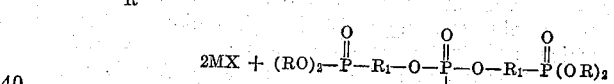

(e)
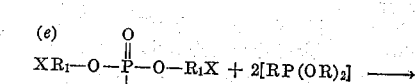

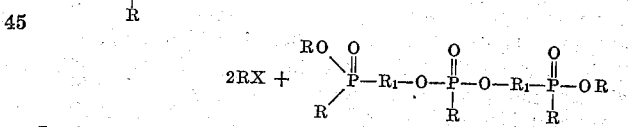

In these reactions R and $R_1$ are defined as above, X represents a halogen, preferably chlorine or bromine, and M represents an alkali metal, preferably sodium or potassium.

The novel compounds of the present invention thus may be prepared conveniently by reacting together a neutral ester of a polybasic oxy-acid of trivalent phosphorus and an ester of a polybasic oxy-acid of pentavalent phosphorus in which the radicals composing the ester groups are halogen substituted. As the trivalent phosphorus ester there may be employed a trialkyl phosphite, wherein the alkyl groups may be the same or dissimilar; or other triester of phosphorus acid with the same or with dissimilar aliphatic alcohols; or alkali metal diester of phosphorous acid; also there can be employed alkyl diesters of phosphonous acids. In all cases, each of the alcohol residues of the esters contain from 1 to 12 carbon atoms, and preferably contain from 1 to 8 atoms.

Suitable trialkyl phosphites which may be employed include, among others, trimethyl phosphite, triethyl phosphite, tri-isopropyl phosphite, tributyl phosphite, di-n-propyl ethyl phosphite, tri-2-ethylhexyl phosphite, trinonyl phosphite and tridodecyl phosphite. Instead of a trialkyl phosphite there may be employed an unsaturated aliphatic triester of phosphorous acid, such as triallyl phosphite, trimethallyl phosphite or allyl diethyl phosphite, or an ester of phosphorous acid with an aliphatic alcohol, which alcohol contains more than one oxy oxygen atom, such as 2-methoxyethyl diethyl phosphite, tris-2-ethoxyethyl phosphite or diethyl 2-(2-ethoxyethyl) ethyl phosphite. Diesters of phosphonous acids which can be employed include, among others, dialkyl benzene phosphonites, such as dibutyl benzene phosphonite and dipropyl benzene phosphonite, and dialkyl alkane phosphonites, such as dibutyl butane phosphonite and dibutyl ethane phosphonite. The alkali metal diesters of phosphorous acids which can be employed include, for example, sodium and potassium dialkyl phosphites, such as sodium dibutyl phosphite, sodium diethyl phosphite, potassium diethyl phosphite, and sodium ethyl butyl phosphite; sodium and potassium alkyl phenyl phosphites, such as sodium phenyl ethyl phosphite and sodium phenyl butyl phosphite.

As the ester of the phosphonic acid, there can be suitably employed compounds of the general structure:

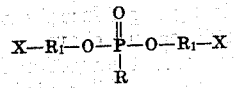

where each X represents an atom of halogen, preferably bromine or chlorine, and the other symbols have the meaning previously assigned to them.

Suitable phosphonic acid esters are those in which the group R is an alkyl radical as defined and the groups $R_1$ each represent alkylene radicals. In typical compounds of the invention, the alkyl radicals represented by the symbol R may be, for example, methyl, ethyl, propyl, isopropyl, normal butyl, secondary butyl, normal hexyl, 2-ethylhexyl, 3,3,5-trimethylhexyl, normal octyl, or normal nonyl and/or their homologs and analogs. Although the alkyl groups represented by the symbol R may be varied over a reasonable range of length of carbon-carbon chain—e. g., from about 1 to about 10 carbon atoms—the most valuable compounds of the invention are those in which the alkyl group represented by the symbol R contain at least two carbon atoms and preferably not more than 8 carbon atoms. Examples of this class are: bis(2-chloroethyl) ethane phosphonate, bis(2-bromoethyl) butane phosphonate, bis(2-bromobutyl) butane phosphonate, bis(2-chloropropyl) decane phosphonate, and bis(2-chloroethyl) decane phosphonate. Other suitable phosphonic acid esters are those in which the group R is an aromatic radical and the groups $R_1$ each are alkylene radicals. Among the compounds composing this class are: bis(2-chloroethyl) benzene phosphonate, bis-(2-chlorobutyl) benzene phosphonate, bis(2-chloropropyl) benzene phosphonate, and bis(2-bromoethyl) benzene phosphonate.

The reaction between the ester of phosphonic acid—in which the ester groups are halogen-substituted—and the ester of phosphorous or phosphonous acid can be effected by heating the reactants together at elevated temperatures. The relative amounts of the two reactants are not critical, but it is preferred that the two reactants should be present in the reaction zone in about stoichiometric proportions—e. g., about 2 moles of the ester of phosphorous or phosphonous acid per mole of phosphonic acid ester. A small excess of the trivalent phosphorus ester—up to an amount about double that stoichiometrically required—is advantageous for more complete conversion of the phosphonic acid ester reactant. Either a lesser or greater amount of the trivalent phosphorus ester can be employed if desired without greatly affecting the efficiency of the reaction; however, undue excesses of either reactant should be avoided to prevent undue amounts of side-reactions. A practical broader range of proportions includes from about 0.5 to about 6 moles of the trivalent phosphorus ester per mole of phosphonic acid ester reactant present.

The reaction ordinarily goes forward efficiently within the temperature range of from about 100° C. to about 250° C., the optimum temperature in a given case depending primarily upon the particular reactants which are there involved. A preferred temperature range is that lying between about 130° C. and 185° C.

Upon commencement of the reaction, and continuing throughout the duration of the reaction, there is formed either an alkali metal halide or an organic halide. This product is formed by the union of either the alkali metal of the alkali metal diester of a phosphorous acid (where such alkali metal diester constitutes the trivalent phosphorus reactant) or by the union of an alcohol radical of a triester of a phosphorous acid or an organic diester of a phosphonous acid (where such organic esters constitute the trivalent phosphorus reactant), with the halogen of the phosphonic acid ester which constitutes the pentavalent phosphorus reactant.

Where an organic halide is formed it advantageously is volatilized continuously from the reaction mixture and withdrawn from the system as formed. Such a procedure may consist of conducting the reaction at boiling in a vessel equipped with a fractionating column and continuously fractionating the evolved organic halide from the vapors, the higher-boiling components of the reaction mixture being condensed and passed back into the reaction vessel. The extent of the reaction may be determined by collecting and measuring the amount of organic halide evolved. Ordinarily heating of the reaction mixture will be continued until the reaction ceases—as evidenced by the fact that formation of the organic halide has ceased. The reaction may be interrupted at any earlier time, if such be desirable.

If an alkali metal halide is formed, it is allowed to remain in the reaction zone until it is judged that the reaction is complete, and then may be removed by washing the reaction mixture thoroughly with warm water.

If desired, the reaction may be carried out in the presence of an organic solvent, such as a hydrocarbon solvent, although the use of a solvent is not essential. Removal of the evolved organic halide may be facilitated if the solvent chosen is such as to permit azeotropic distillation. Solvents which have been found eminently suitable for the purpose are exemplified by such solvents as toluene and xylene.

In conducting the reaction, the total amount of each reactant may be charged to the reaction vessel initially, or, preferably, one of the reactants may be charged to the reaction vessel initially and the other reactant added progressively during the course of the reaction. Where the trivalent phosphorus reactant contains no alkali metal, the desired product may be recovered from the reaction mixture by any suitable method, such as by distillation in vacuo, by treatment with selective solvents, or by equivalent procedures. Where there is formed an alkali metal halide, the reaction mixture must first be washed thoroughly with warm water to remove the halide, then the above procedure may be followed to isolate the desired product.

The following examples are presented for the purpose of illustrating the invention. It is to be understood that the invention is not intended to be restricted to the specific illustrative examples and that other specific modifications are included in the invention. In these examples, the parts given are parts by weight.

EXAMPLE I

*Preparation of bis[2-(di-n-butyl phosphono)ethyl] benzene phosphonate*

This compound was prepared by the following procedure: 130 parts of 2,2'-dibromodiethylbenzene phosphonate (bis(2-bromoethyl)benzene phosphonate) were charged into a reaction vessel equipped with a fractionating column arranged for reflux of condensate. The vessel was heated to about 160° C. and 263 parts of tributyl phosphite were introduced dropwise into the reaction vessel over a time period of about 2½ hours. The pressure inside the reaction vessel was maintained at such a reduced level that continuous reflux was maintained. The butyl bromide formed by the reaction was removed as formed through the fractionating column. When the formation of butyl bromide ceased, the reaction mixture was distilled. There resulted 145 grams of a product containing the desired compound. The product was an oily liquid, which boiled in the range 168° C.–190° C. at 0.014 mm. mercury pressure. It had a density (d 20/4) of 1.1055, and an index of refraction (n 20/D) of 1.4757. Analysis of the product showed a phosphorus content of 15.5% as compared to a calculated phosphorus content of 15.7%, both percentages being weight percentages.

EXAMPLE II

*Preparation of bis[2-(di-n-butyl phosphono)ethyl] butane phosphonate*

Thirty-four parts of sodium metal are dissolved in 1000 cc. of toluene to which 310 parts of dibutyl phosphite are added. The mixture is heated to from about 110° C. to about 115° C. and over a time period of 1 hour, 137 parts of bis(beta-chloroethyl) butane phosphonate are added to the reaction mixture. The mixture is refluxed at about 120° C. for about 18 hours, with continuous stirring. The reaction mixture is then cooled and washed three times with warm water to remove the salt formed.

The structural formula for bis[2-(di-n-butyl phosphono)ethyl]butyl phosphonate is:

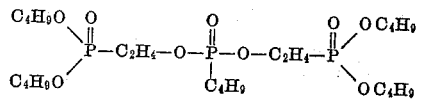

EXAMPLE III

*Preparation of bis[2-(propyl propane phosphinico)2-(ethyl)ethyl]benzene phosphonate*

To a reaction vessel fitted with a fractionating column arranged for reflux of condensate there are charged 130 parts of 2,2'-dibromodibutyl benzene phosphonate. The mixture is warmed to about 120° C., and is stirred constantly. Two hundred fifty-seven parts of dipropyl propane phosphonite are added over a time period of 1½ hours. The mixture is slowly heated to about 165° C. Throughout the reaction period the evolved vapors are fractionated, butyl bromide being withdrawn overhead from the top of the column while higher-boiling materials are condensed and returned to the reaction vessel. The reaction mixture is then distilled to recover in good yield the bis[2-(propyl propane phosphinico)2-(ethyl)ethyl] benzene phosphonate.

The structural formula for this compound is:

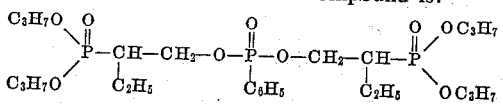

In addition to the specific products disclosed and characterized in the foregoing examples, the following are illustrative compounds which are provided by the invention and which can be prepared by the procedure illustrated in the examples:

a. Bis[2(diallyl phosphono)propyl] benzene phosphonate, formed by the reaction of triallyl phosphite and bis(2-chloropropyl) benzene phosphonate.

b. Bis[2(allyl ethyl phosphono)ethyl] benzene phosphonate, formed by the reaction of sodium allyl ethyl phosphite and bis(2-bromoethyl) benzene phosphonate.

c. Bis[2(methallyl ethane phosphinico)propyl] decane phosphonate, formed by the reaction of dimethallyl ethane phosphonite and bis(2-chloropropyl) decane phosphonate.

d. Bis[2(ethyl benzene phosphinico)ethyl] butane phosphonate, formed by the reaction of diethyl benzene phosphonite and bis(2-chloroethyl) butane phosphonate.

e. Bis[2(propyl phenyl phosphono)ethyl] benzene phosphonate, formed by the reaction of sodium propyl phenyl phosphite and bis(2-bromoethyl) benzene phosphonate.

f. Bis[2(dimethallyl phosphono)butyl] butane phosphonate, formed by the reaction of trimethallyl phosphite and bis(2-chlorobutyl) butane phosphonate.

g. Bis[2(methoxyethyl ethane phosphinico)butyl]benzene phosphonate, formed by the reaction of di(methoxymethyl) ethane phosphonite and bis(2-chlorobutyl) benzene phosphonate.

The novel compounds of the invention, which range in physical characteristics from viscous liquids to soft solids, are of particular interest by reason of their compatibility with synthetic as well as naturally occurring resins. This property makes them particularly useful as plasticizing agents for such resins. The new esters may also be used as additives for known synthetic and naturally occurring lubricants, such as mineral oils, polyesters of polycarboxylic acids, alkylene oxide polymers, and the like. The physical characteristics of the novel compounds render them particularly suitable for use as hydraulic fluids for applications in which a high viscosity index is desirable.

We claim as our invention:

1. A phosphorus ester having the structure represented by the formula:

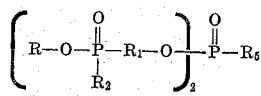

in which formula R represents a member of the class consisting of aliphatic hydrocarbon groups containing from 1 to about 12 carbon atoms each and monocyclic aromatic hydrocarbon groups, $R_1$ represents an alkylene group containing from 2 to about 10 carbon atoms, $R_5$ is a member of the class consisting of aliphatic hydrocarbon radicals containing from 1 to 8 carbon atoms each and monocyclic aromatic hydrocarbon radicals and $R_2$ represents a group selected from the class consisting of the groups represented by R and the groups represented by R—O—.

2. A phosphorus ester having the structure represented by the formula:

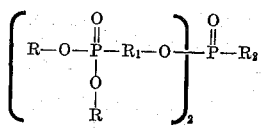

wherein R represents an alkyl group containing from 1 to about 12 carbon atoms, $R_1$ represents an alkylene group containing from 2 to about 8 carbon atoms, and $R_2$ represents an alkyl group containing from 1 to 8 carbon atoms.

3. A phosphorus ester having the structure represented by the formula:

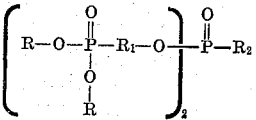

wherein R represents an alkyl group containing from 1 to about 12 carbon atoms, $R_1$ represents an alkylene group containing from 2 to about 8 carbon atoms, and $R_2$ represents a monocyclic aromatic hydrocarbon group.

4. A phosphorus ester having the structure represented by the formula:

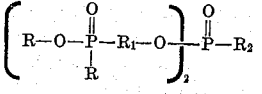

wherein R represents an alkyl group containing from 1 to about 12 carbon atoms, $R_1$ represents an alkylene group containing from 2 to about 8 carbon atoms, and $R_2$ represents an alkyl group containing from 1 to 8 carbon atoms.

5. A phosphorus ester having the structure represented by the formula:

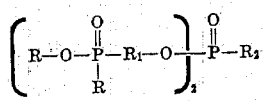

wherein R represents an alkyl group containing from 1 to about 12 carbon atoms, $R_1$ represents an alkylene group containing from 2 to about 8 carbon atoms, and $R_2$ represents a monocyclic aromatic hydrocarbon group.

6. Bis[2-(di-n-butyl phosphono)ethyl] benzene phosphonate.

7. Bis[2-(propyl propane phosphinico)2-(ethyl)ethyl] benzene phosphonate.

8. Bis[2-(di-n-butyl phosphono)ethyl] butane phosphonate.

9. The process which comprises heating a phosphorus ester of the formula:

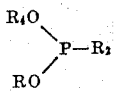

in which R represents a member of the class consisting of aliphatic hydrocarbon groups containing from 1 to about 12 carbon atoms and monocyclic aromatic hydrocarbon groups, $R_4$ is a lower alkyl group, and $R_2$ represents a group selected from the class consisting of the groups represented by R and the groups represented by R—O—, to a temperature within the range of from about 100° C. to about 250° C., adding a phosphonate of the formula:

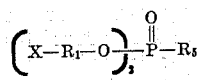

in which $R_5$ represents a member of the class consisting of aliphatic hydrocarbon groups containing from 1 to 8 carbon atoms and monocyclic aromatic hydrocarbon groups, $R_1$ represents an alkylene group containing from 1 to about 8 carbon atoms, and X represents a member of the group consisting of bromine and chlorine, at about the rate the phosphonate is consumed in the ensuing reaction, and thereafter recovering a product having the structure represented by the formula:

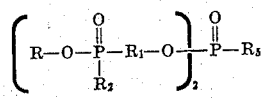

wherein the various symbols have the respective meanings set out hereinbefore.

10. The process which comprises heating a phosphorus ester of the formula:

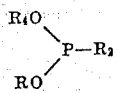

in which R represents a member of the class consisting of aliphatic hydrocarbon groups containing from 1 to about 12 carbon atoms and monocyclic aromatic hydrocarbon groups, $R_4$ is a lower alkyl group, and $R_2$ represents a group selected from the class consisting of the groups represented by R and the groups represented by R—O—, to a temperature within the range of from about 100° C. to about 250° C., adding a phosphonate of the formula:

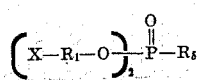

in which $R_5$ represents a member of the class consisting of aliphatic hydrocarbon groups containing from 1 to 8 carbon atoms and monocyclic aromatic hydrocarbon groups, $R_1$ represents an alkylene group containing from 1 to about 8 carbon atoms, and X represents a member of the group consisting of bromine and chlorine, to produce a compound having the structure represented by the formula:

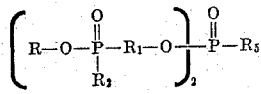

wherein the various symbols have the respective meanings set out hereinbefore.

11. The process which comprises heating a member of the class consisting of the trialkyl phosphites, $(RO)_3P$, and alkali metal salts of dialkyl phosphites, $$(MO)P(OR)_2$$

wherein M is an alkali metal and R is an alkyl group containing from 1 to about 12 carbon atoms, to a temperature within the range of from about 100° C. to about 250° C., adding a phosphonate of the formula:

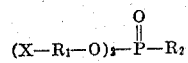

in which $R_1$ represents an alkylene group containing from 2 to about 8 carbon atoms, $R_2$ represents an alkyl group containing from 1 to 8 carbon atoms and X represents a member of the group consisting of bromine and chlorine, to produce a product having the structure represented by the formula:

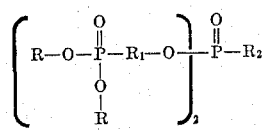

wherein the various symbols have the respective meanings set out hereinbefore.

12. The process which comprises heating a phosphorus ester of the formula:

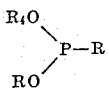

in which R represents an alkyl group containing from 1 to about 12 carbon atoms and $R_4$ is a lower alkyl radical, to a temperature within the range of from about 100° C. to about 250° C., adding a phosphonate of the formula:

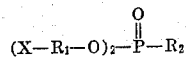

in which $R_1$ represents an alkylene group containing from 2 to about 8 carbon atoms, $R_2$ represents an alkyl group containing from 1 to 8 carbon atoms and X represents a member of the group consisting of bromine and chlorine, to produce a product having the structure represented by the formula:

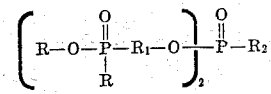

wherein the various symbols have the respective meanings set out hereinbefore.

13. The process which comprises heating a member of the class consisting of the trialkyl phosphites, $(RO)_3P$, and alkali metal salts of dialkyl phosphites, $$(MO)P(OR)_2$$

wherein M is an alkali metal and R is an alkyl group containing from 1 to about 12 carbon atoms, to a temperature within the range of from about 100° C. to about 250° C., adding a phosphonate of the formula:

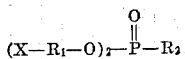

in which $R_1$ represents an alkylene group containing from 2 to about 8 carbon atoms, $R_2$ represents a monocyclic aromatic hydrocarbon group and X represents a member of the group consisting of bromine and chlorine, to produce a product having the structure represented by the formula:

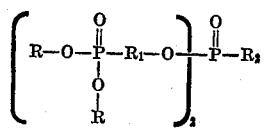

wherein the various symbols have the respective meanings set out hereinbefore.

14. The process consisting of reacting bis(2-bromoethyl) benzene phosphonate with tri-n-butyl phosphite at a temperature of from about 100° C. to about 250° C. to produce bis[2(di-n-butyl phosphono)ethyl] benzene phosphonate.

15. The process consisting of reacting bis(2-bromobutyl) benzene phosphonate with dipropyl propane phosphonite at a temperature of from about 100° C. to about 250° C. to produce bis[2(propyl propane phosphinico)-2-(ethyl)ethyl] benzene phosphonate.

References Cited in the file of this patent
UNITED STATES PATENTS

| | | |
|---|---|---|
| 2,612,488 | Nelson | Sept. 30, 1952 |
| 2,632,767 | Smith et al. | Mar. 24, 1953 |
| 2,634,226 | Kosolapoff | Apr. 7, 1953 |